United States Patent [19]

Milton

[11] Patent Number: 5,046,844

[45] Date of Patent: Sep. 10, 1991

[54] APPARATUS FOR INSPECTING AND HANGERING SHIRTS

[75] Inventor: David W. Milton, Middletown, Ohio

[73] Assignee: Cintas Corporation, Cincinnati, Ohio

[21] Appl. No.: 204,870

[22] Filed: Jun. 10, 1988

[51] Int. Cl.[5] ............................................. G01N 21/88
[52] U.S. Cl. .................................. 356/238; 73/865.8; 198/680
[58] Field of Search ....................... 356/238; 198/680; 73/865.8; 364/470

[56] References Cited

U.S. PATENT DOCUMENTS

| | | | |
|---|---|---|---|
| 2,051,946 | 8/1936 | Hewlett | 356/240 |
| 2,443,069 | 6/1948 | Gayring . | |
| 2,551,209 | 5/1951 | Glover, Sr. et al. . | |
| 2,916,132 | 12/1959 | Leiser . | |
| 2,936,061 | 5/1960 | Brunner et al. . | |
| 2,946,427 | 7/1960 | Friedman . | |
| 2,997,133 | 8/1961 | Gehrke . | |
| 3,006,453 | 10/1961 | Tonelli . | |
| 3,097,391 | 7/1963 | Wayne . | |
| 3,124,236 | 3/1964 | Gerisch . | |
| 3,194,383 | 7/1965 | Kuwertz . | |
| 3,247,952 | 4/1966 | Kozlosky . | |
| 3,454,148 | 7/1969 | Harrison . | |
| 3,580,378 | 5/1971 | Pedersen . | |
| 3,620,354 | 11/1971 | McMillan . | |
| 3,785,474 | 1/1974 | Nakamoto . | |
| 3,799,318 | 3/1974 | Dekoekkoek . | |
| 3,917,112 | 11/1975 | Willis et al. . | |
| 3,961,699 | 6/1976 | Hirsch . | |
| 4,018,327 | 4/1977 | Goodman et al. . | |
| 4,022,338 | 5/1977 | Laursen . | |

FOREIGN PATENT DOCUMENTS

| | | | |
|---|---|---|---|
| 0050516 | 4/1982 | European Pat. Off. . | |
| 485712 | 12/1929 | Fed. Rep. of Germany | 356/238 |
| 1392293 | 4/1975 | United Kingdom . | |

Primary Examiner—Samuel Turner
Attorney, Agent, or Firm—Wood, Herron & Evans

[57] ABSTRACT

An apparatus for inspecting and hangering an open-necked garment such as a shirt comprises an inspection station having a garment form in the shape of the shoulders of a shirt, and lighting fixtures positioned beneath the garment form so that when a shirt is placed on the garment form the lighting fixtures shine light from the interior of the shirt through the shirt to permit visual inspection of tears, holes, stains and other defects. Hangers are automatically fed to the inspection station immediately adjacent the garment form with the hook portion of the hanger extending through the open neck of the shirt. Once the inspection operation is completed, an automatic hanger take-away device removes the hanger, and the shirt draped over the hanger and garment form, from the inspection station for further processing.

13 Claims, 5 Drawing Sheets

APPARATUS FOR INSPECTING AND HANGERING SHIRTS

FIELD OF THE INVENTION

This invention relates to the inspection of shirts in commercial or industrial laundries, and, more particularly, to an apparatus having a combined inspection and hangering station at which the operator can visually and physically inspect both the exterior and interior of a shirt and where the inspected shirts are then automatically hangered and carried away to a location for further processing.

BACKGROUND OF THE INVENTION

Commercial and industrial laundering facilities for processing clothing such as employee uniforms have become increasingly sophisticated in order to meet customer demand efficiently and economically. Laundering is only one aspect of the service provided by commercial and industrial laundries. After laundering, a garment such as a shirt must be dried, visually and manually inspected and hangered. The hangered shirts are then transferred to a machine for removing the wrinkles and from there to devices for sorting the shirts so that they are delivered to the proper customer.

The speed at which garments such as shirts can be processed in commercial laundering facilities is dependent in part upon the time required to inspect the shirts for defects and then to hanger them in preparation for further processing. In the past, both the inspection and hangering operations have been done manually. Inspection of a shirt requires the worker to visually observe the back, front, sides and neck area of the shirt, and then to manually handle the shirt to feel any defects which might be missed by the visual inspection. After such inspection, it is customary to manually place the shirt on a hanger and then hook the hangered shirt on a rack or bar for transport to the next processing station.

A problem with the prior art method of inspecting shirts described above is that the worker has to perform the visual and touch inspection operations separately, and this increases the time required to completely inspect a shirt. To visually inspect a shirt, workers have had to grasp the shirt by hand and turn it from front to back so that the buttons, buttonholes, shirt pocket, collar and other areas of the shirts can be fully viewed. After this visual inspection, the worker then performs a touch inspection before placing the shirt on a hanger. This two-stage inspection procedure for inspecting shirts, and the manual placement of the inspected shirts on hangers, are time-consuming operations but are necessary to find defects and to process the shirts through the laundering facility.

Another problem with prior art methods of inspecting shirts is that the visual inspection is usually limited to an examination of the exterior surfaces of the garment. In most cases, no attempt is made to inspect the interior surfaces of the front, back, sides or arms of the shirt where defects could be present but go unnoticed from an inspection of the exterior surfaces of the shirt.

SUMMARY OF THE INVENTION

It is therefore among the objectives of this invention to provide an apparatus for the inspection and hangering of shirts, particularly adapted for use in commercial and industrial laundering facilities, which increases the accuracy and completeness of the inspection operation, which decreases the time required for inspection and which decreases the time required for hangering of the shirts.

These objectives are accomplished in an apparatus for inspecting and hangering shirts which comprises a combined inspection-hangering station, a feed device for automatically supplying hangers to the inspection-hangering station and a take-away device for removing hangered shirts from the inspection-hangering station. A garment form in the shape of the shoulders of a shirt or similar open-necked garment is mounted to a vertical post at the inspection station. The post supports a pair of elongated lighting fixtures which are positioned immediately beneath the garment form. An automatic hanger feeding apparatus first supplies hangers one at a time to a position against the garment form so that the hook portion of the hangers extends vertically above the garment form. A shirt or similar open-necked garment to be inspected is then draped at its shoulders over the garment form and hanger so that the hook portion of the hanger extends through the neck of the shirt and the lights carried beneath the garment form are positioned within the interior of the shirt. In this position, the exterior and interior surfaces of the shirt can be simultaneously visually and physically inspected, and the lights are illuminated to shine light through the shirt to permit inspection of seam rips, holes, stains or other defects in the shirt. After completion of the inspection operation, a take-away device engages the hook portion of the hanger to lift it, and the shirt draped over the garment form and hanger, upwardly away from the inspection station for further handling.

The method and apparatus of this invention is predicated upon the concept of permitting visual and touch inspection of a garment such as a shirt, both on its interior and exterior surfaces, at an inspection station wherein the garment is also automatically hangered and taken away to another processing location. The garment form hangs the shirt in a position for convenient visual and touch inspection. In addition, the lights beneath the garment form shine light through the shirt to permit visual inspection thereof. Automatic hangering of the shirt is also performed efficiently at the inspection-hangering station. The hangers are automatically fed in position against the garment form before the shoulder portion of a shirt is draped over the garment form for inspection. The inspected shirt is then automatically taken away to another location by removing the hanger from the garment form and carrying the shirt along with it. The number of manual operations required to perform the inspection and hangering operation with the apparatus herein are therefore significantly reduced which increases the overall speed and efficiency of processing the shirts while ensuring that a thorough, accurate inspection is performed.

In the presently preferred embodiment, the inspection station includes a vertical post which mounts a horizontal platform on which the garment form is carried. The shoulders of the shirt rest upon the garment form and an end of the platform engages the back of the shirt to separate it from the front so that the sides and arms of the shirt are fully visible. The elongated lighting fixtures, such as fluorescent lights, are carried on either side of the post immediately beneath the garment form. In this position, the lights are located within the interior of a shirt placed on the garment form so that they shine light through the entire shirt.

Preferably, the inspection-hangering station also includes a mirror which is positioned rearwardly of the post. With a shirt positioned on the garment form, the inspector can directly view the front of the shirt and indirectly view the back of the shirt in the mirror without changing his or her position. This eliminates the need for the inspector to walk around the shirt, and/or to rotate the shirt relative to the inspector, in order to completely inspect the back, front and sides of the shirt.

The hanger feed mechanism herein is essentially identical to that disclosed in my co-pending application, Ser. No. 07/139,293, filed Dec. 29, 1987, entitled "Apparatus For Inspecting and Hangering Pants", which is incorporated by reference in its entirety herein. The hanger feed mechanism is operable to support a plurality of hangers by their hook portions and then discharge the hangers one by one onto a feed arm. The hook portions of the hangers slide by gravity along the feed arm and come to rest against the rearward side of the garment form in a position wherein the hook portion of the hanger extends through the neck of a shirt mounted on the garment form.

Once the inspection operation is completed, a take-away device engages the hook portion of the hanger located at the garment form and lifts it upwardly from the inspection-hangering station. In the course of being lifted upwardly, the hanger engages the shoulders of the shirt and carries the shirt therealong for movement to another processing station. This take-away device operates in a manner which is essentially identical to that disclosed in my co-pending patent application Ser. No. 07/139,293, mentioned above.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
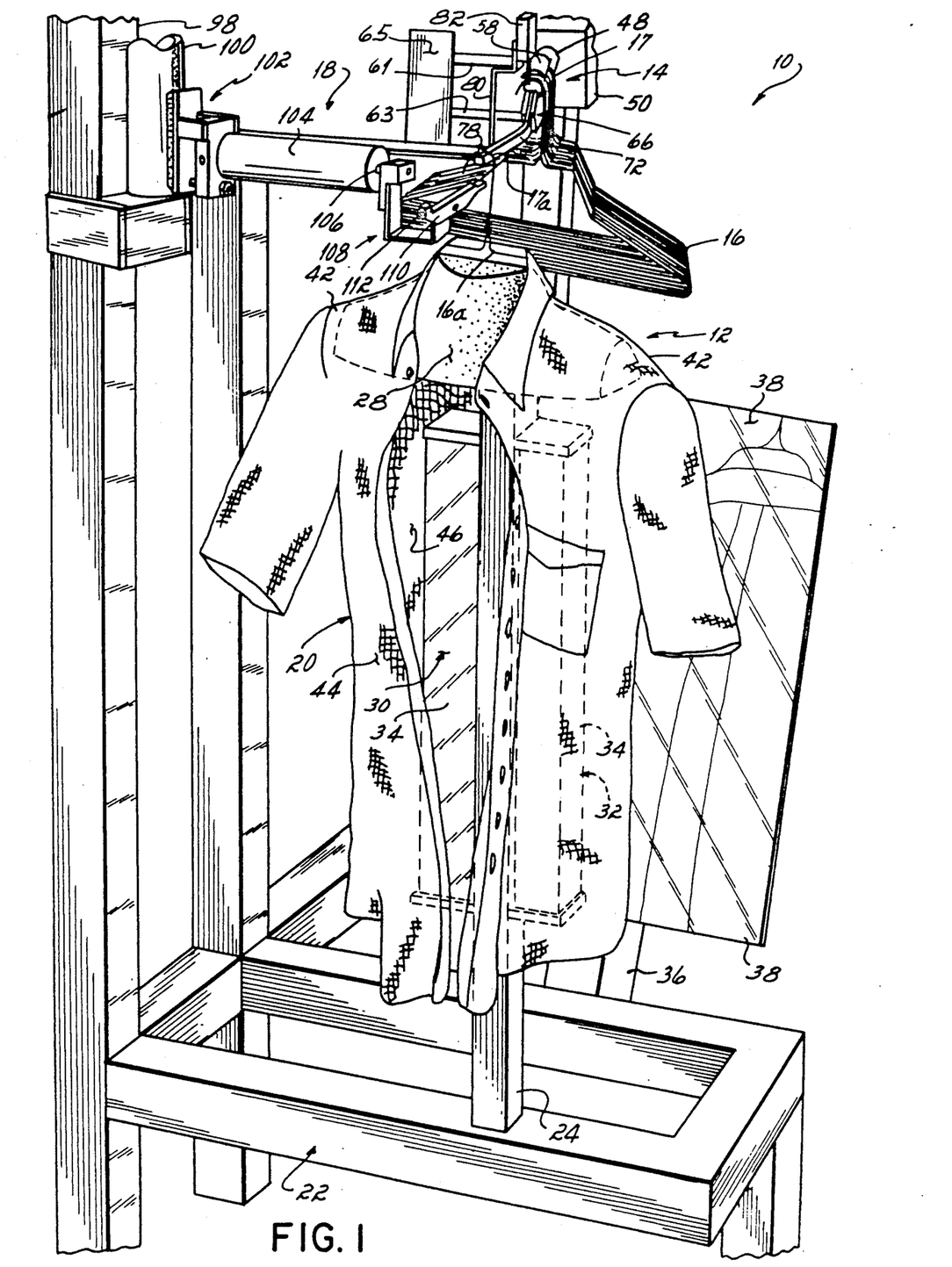
FIG. 1 is a partial perspective view of the shirt hangering apparatus herein in which a shirt is positioned at the inspection-hangering station.
Figure 3:
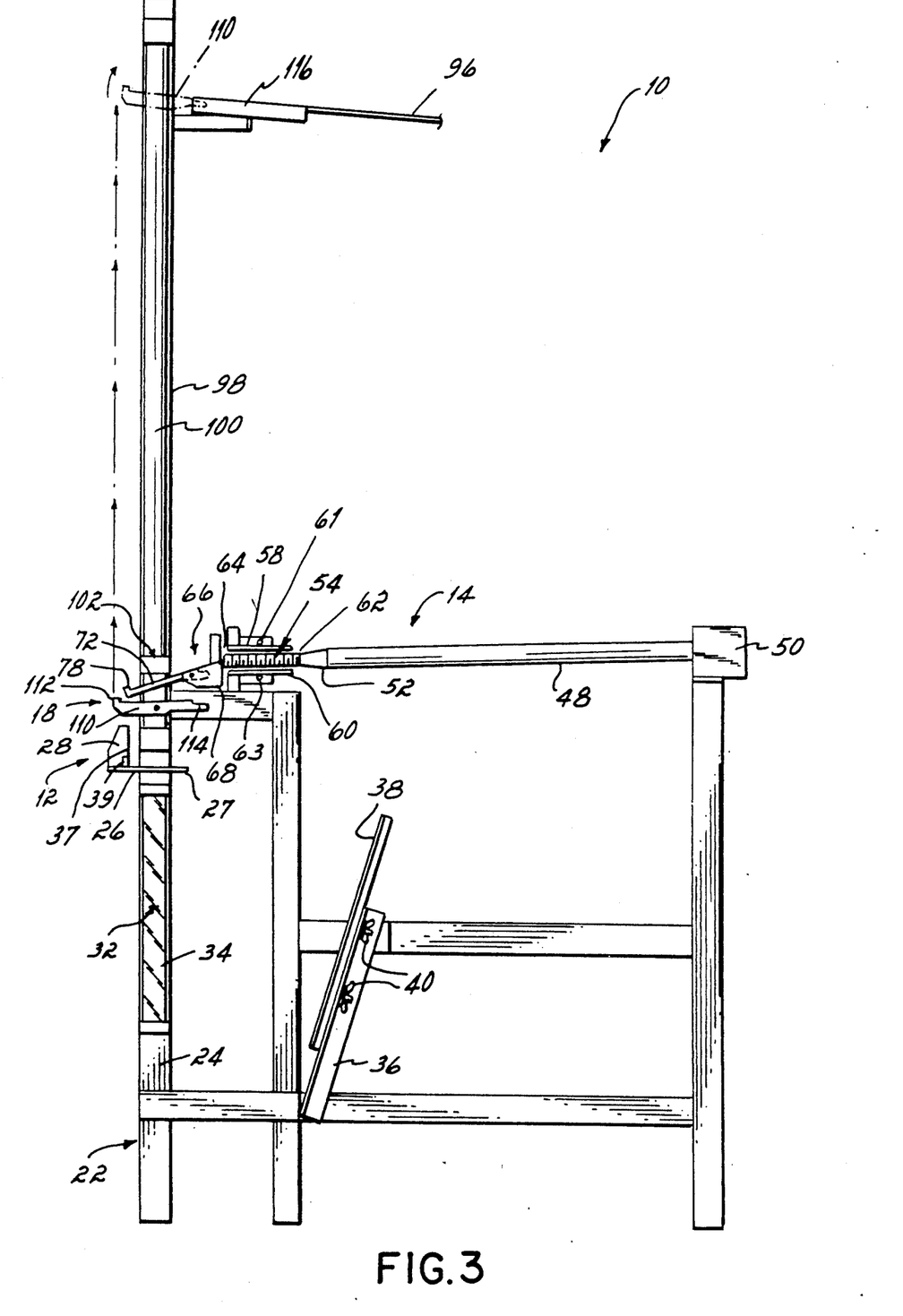
FIG. 3 is a side elevational view of the apparatus herein showing the hanger feed mechanism and a portion of the hanger take-away device.

Referring now to FIGS. 1 and 3, the inspection and hangering apparatus 10 includes an inspection-hangering station 12, a hanger supply device 14 for feeding hangers 16 to the inspection-hanging station 12 and a hanger take-away device 18 associated with a further processing station (not shown). As described in detail below, a shirt 20 or similar open-necked garment, is manually positioned at the inspection-hangering station 12 and inspected for tears, holes, stains or other defects on both its interior and exterior surfaces. After inspection, the shirt 20 is automatically lifted from the inspection-hangering station 12 by the take-away device 18 in preparation for the inspection of another shirt 20. The supply of hangers 16 to the inspection-hangering station 12, and the take-away of the hangered shirt 20 therefrom, is performed automatically without any handling of the hangers 16 by the inspector.

Inspection-Hangering Station

Figure 2:
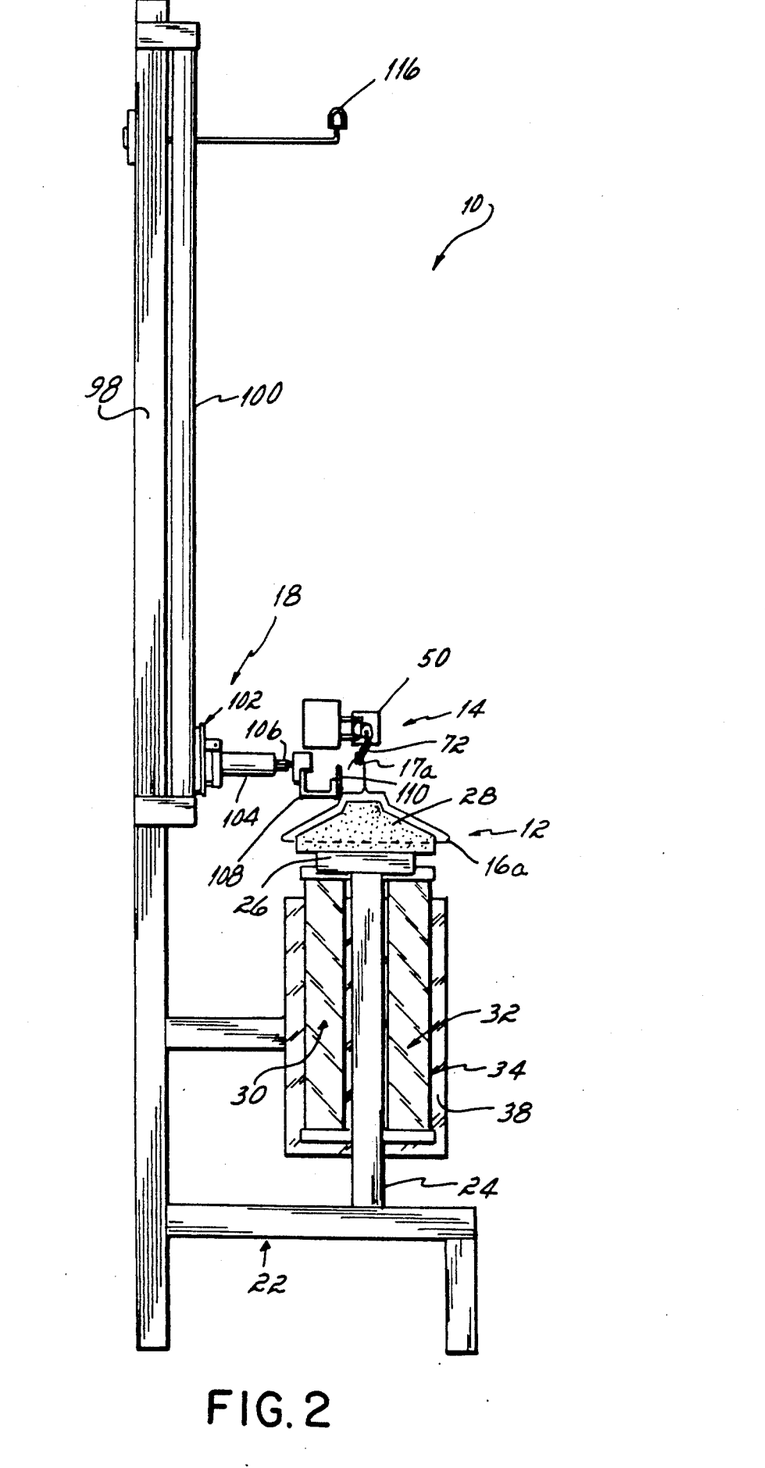
FIG. 2 is a front, elevational view of the inspecting and hangering apparatus herein prior to placing a shirt at the inspection-hangering station.

Referring to FIGS. 1, 2 and 3, the inspection-hangering station 12 is located at one end of a support frame 22. A vertical post 24 extends upwardly from the support frame 22 and mounts a horizontally disposed platform 26 at its upper end. The forward end of the platform 26 supports a garment form 28 which is formed in the shape of the shoulders of an open-necked garment such as shirt 20. The opposite, rearward end 27 of the platform 26 extends some distance rearwardly from the vertical post 24. For purposes of the present discussion, the term "forward" refers to the lefthand portion of the apparatus 10 as viewed in FIG. 3, and the term "rearward" refers to the righthand portion of the apparatus 10 in such FIG.

In the presently preferred embodiment, the vertical post 24 mounts a pair of elongated lighting fixtures 30 and 32 which extend vertically on either side of the post 24 from a point immediately beneath the platform 26 toward the base of support frame 22. Preferably, the lighting fixtures 30, 32 each include a transparent housing 34 within which one or more fluorescent lights (not shown) are located. A bracket 36 is mounted to the support frame 22 rearwardly of the vertical post 24 and garment form 28. This bracket 36 supports a mirror 38 which is adjustably mounted thereto by wing nuts 40.

The inspection operation for a shirt 20 is performed as follows. The shirt 20 is manually placed upon the garment form 28 so that the shoulders 42 of the shirt rest atop the garment form 28, the front 44 of the shirt 20 faces the forward direction and the back 46 of the shirt 20 faces the rearward direction. In this position, the lighting fixtures 30, 32 are located completely within the interior of the shirt 20 along the vertical post 24.

The inspector stands relative to the shirt 20 in position to directly view the front 44 and conduct an inspection of the collar, arms, pocket, buttons, buttonholes and sides of the shirt 20. Standing in this position, the inspector can also indirectly view the back 46 of the shirt 20 by looking into the mirror 38 positioned rearwardly of the shirt 20. The mirror 38 eliminates the need for the inspector to walk around to the back 46 of the shirt 20, or to rotate the shirt 20 relative to the inspector, in order to perform visual inspection of the back 46. Additionally, the lighting fixtures 30, 32 are energized during the visual inspection operation to shine light from the interior of the shirt 20 through the shirt 20 which enables the inspector to visually check for any tears, rips, stains or other defects.

A touch inspection is also performed by the inspector with the shirt 20 in position on the garment form 28. The shirt 20 is in an extended, unfolded position where it can be easily and quickly physically inspected to detect any defects that may not be readily visible.

Hanger Supply Mechanism

One advantage of the apparatus 10 is that manual handling of hangers 16 by the inspector is virtually eliminated. Hangers 16 are automatically fed to a take-away position adjacent the garment form 28 at the inspection-hangering station 12 to receive the shirt 20 placed on the garment form 28. The hangers 16 are thereafter removed from the take-away position at the inspection-hangering station 12 by the take-away device 18, and in the course of being taken away, the hangers 16 contact the shirt 20 and carry it to another station for further processing.

Figure 5:
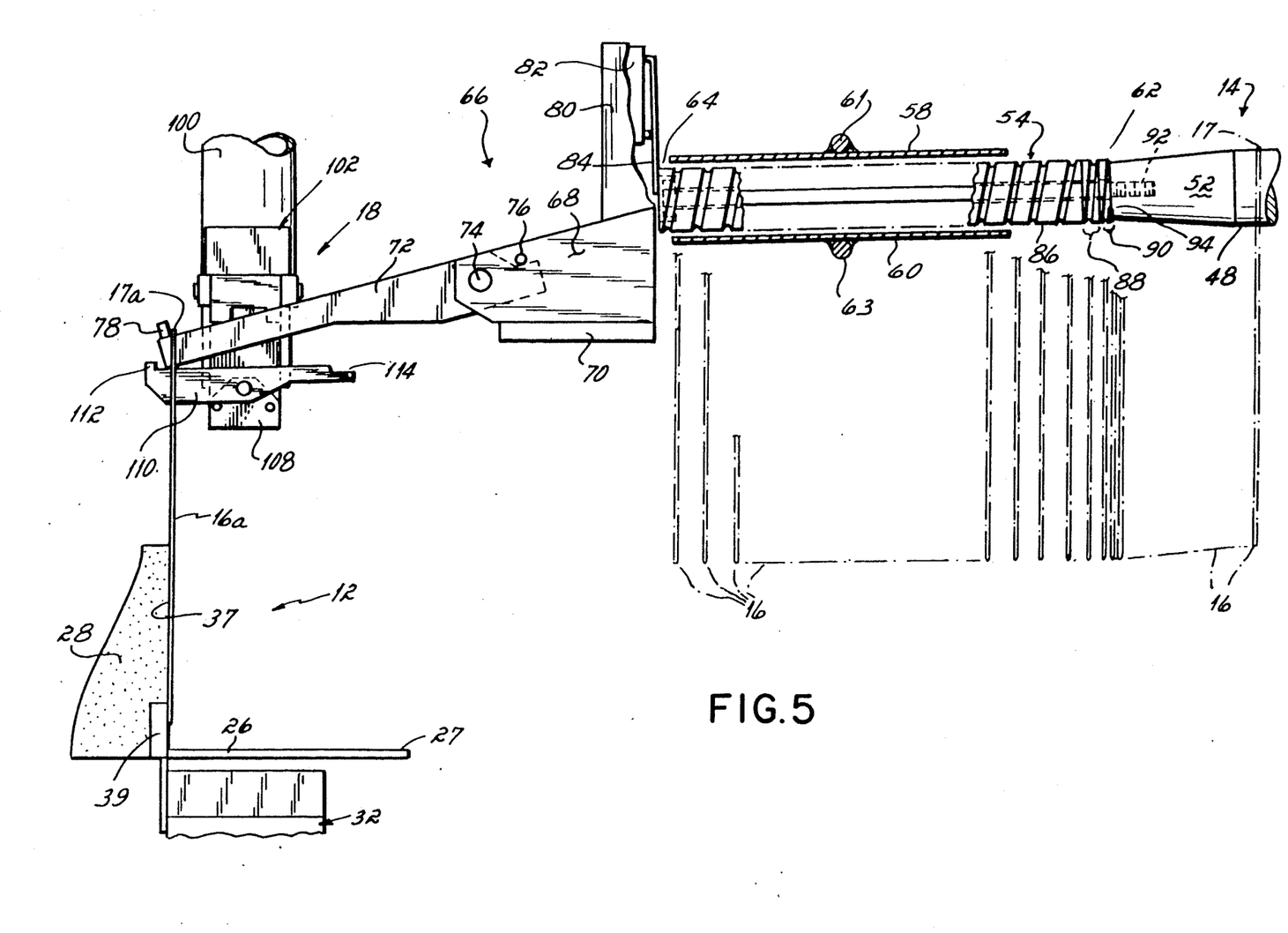
FIG. 5 is an enlarged view of a portion of FIG. 3 showing the hanger feed mechanism in more detail.

Referring to FIGS. 3 and 5, the hanger supply device 14 of apparatus 10 is substantially identical to that disclosed in my co-pending application Ser. No. 07/139,293, filed Dec. 29, 1987, and entitled "Apparatus For Inspecting and Hangering Pants", the disclosure of which is incorporated by reference in its entirety herein. The hanger supply device 14 comprises an inclined supply rod 48 which is rotatably driven by a motor 50 carried on the end of support frame 22 opposite the inspection-hangering station 12. The supply rod 48 is formed with a tapered end 52 opposite the motor 50 which is connected to an externally threaded shaft 54 rotatable with the supply rod 48. A pair of arcuate plates 58, 60 are positioned at the top and bottom of shaft 54, respectively. These plates 58, 60 are mounted to the frame 22 by rods 61, 63, respectively, which are carried at one end by a plate 65. See also FIG. 1.

In the presently preferred embodiment, the shaft 54 is formed with a pick-off end 62 connected to the tapered end 52 of supply rod 48, and a discharge end 64 located adjacent a hanger transfer member 66. The hanger transfer member 66 comprises a plate 68 mounted by a bracket 70 adjacent the discharge end 64 of shaft 54, and a feed arm 72 which is pivotally mounted by a pin 74 to the plate 68. The rearward end of the feed arm 72 is held in a downwardly angled position with respect to the plate 68 by a stop 76 carried on the plate 68, and the forward end of feed arm 72 has an upright finger 78.

Figure 4:
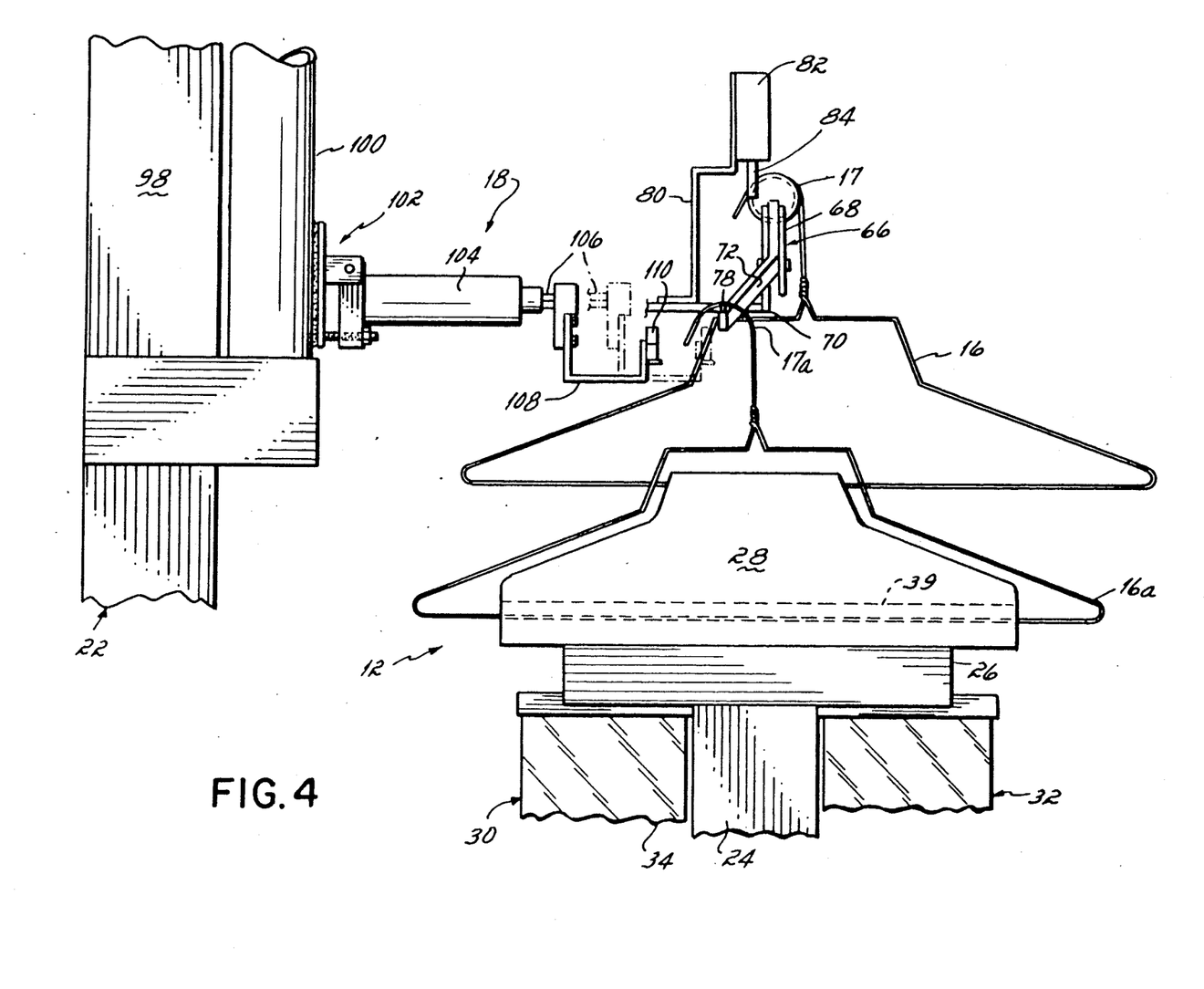
FIG. 4 is an enlarged view of a portion of FIG. 2 illustrating the hanger take-away device in more detail.

As shown in FIG. 4, the bracket 70 which supports the hanger transfer member 66 also mounts a support 80 which carries a limit switch 82. The limit switch 82 has a trip arm 84 in contact with the discharge end 64 of shaft 54 and is electrically connected to the motor 50 which rotates supply rod 48.

The operation of the hanger supply device 14 is as follows. The hook portion 17 of a plurality of hangers 16 rests on the supply rod 48 which is angled slightly from the end carried by motor 50 toward its tapered end 52 so that the hangers 16 slide by gravity toward the tapered end 52. A greater angulation is provided in the supply rod 48 at its tapered end 52 to smoothly feed the hangers 16 to the pick-off end 62 of the shaft 54. At this pick-off end 62, the hook portion 17 of each hanger 16 is engaged by the leading or inner thread on the exterior surface of the shaft 54. One hanger 16 is carried in each groove between adjacent threads of shaft 54 and the hangers 16 are advanced toward the discharge end 64 of shaft 54 as it rotates with supply rod 48. In addition to being a support for the free or discharge end of the rod, the arcuate plates 58, 60 at the top and bottom of shaft 54 help retain the hangers 16 in place therealong.

When the inspector is ready to inspect a shirt 20, the inspector activates motor 50 by pressing a foot pedal control or the like (not shown) to rotate the supply rod 48, and, in turn, shaft 54, so that one hanger 16 is released from between the outermost threads of the shaft 54 at its discharge end 64. The hook portion 17 of a hanger 16 slides by gravity along the plate 68 and feed arm 72 of the hanger transfer member 66, and then comes to rest at the finger 78 at the end of feed arm 72. As shown in FIGS. 4 and 5, the feed arm 72 is positioned relative to the inspection-hangering station 12 so that the hanger 16 is placed against the rearward side 37 of the garment form 28 and the hook portion 17 of the hanger 16 extends vertically upwardly therefrom. A magnet 39 embedded in rear side 37 of form 28 helps to locate and maintain the hanger in the desired position relative to the form 28. As the hanger 16 is discharged from the discharge end 64 of shaft 54, the limit switch 82 is moved forwardly by the discharged hanger 16 which opens the electrical circuit to the motor 50 and stops its operation until the inspector again activates the foot pedal to start motor 50.

In the presently preferred embodiment, the shaft 54 is adjustable to accommodate hangers 16 of different gauge. This is accomplished by forming the shaft 54 in different sections to permit adjustment of the position of the leading or innermost thread at its pick-off end 62. Preferably, the shaft 54 comprises a major, outer threaded section 86, an intermediate threaded section 88 and an inner section 90 interconnected by a lag bolt 92 which extends from the discharge end 64 of shaft 54 into the tapered end 52 of supply rod 48. When thus assembled, the intermediate threaded section 88 and inner section 90 form the pick-off end 62 of shaft 54.

Preferably, the inner section 90 of shaft 54 is formed with a single leading or inner thread 94. The position of this leading thread 94 is adjustable relative to the first thread on the intermediate section 88 to vary the gap or space therebetween and thus accommodate hangers of different gauge to ensure that each size hanger 16 is smoothly transferred from the supply rod 48 to the shaft 54. Once this adjustment is made, the inner section 90 and intermediate section 88 are then rotated as a unit until the discharge end of the last thread on the intermediate section 88 lines up with the inlet end of the first thread on the outer section 86. The lag bolt 92 is then tightened to secure all three sections 86, 88, 90 together.

Take-Away Device

The shirt take-away device 18 is operable to lift the hanger 16, and the shirt 20 carried on the garment form 28, from the inspection-hangering station 12. The hanger 16 and shirt 20 are carried vertically upwardly and then released onto a take-away rail 96, described below, for processing at another station.

Referring to FIGS. 1, 2 and 4, the take-away device 18 includes a vertical column 98 mounted to the support frame 22 adjacent the inspection-hangering station 12. The vertical column 98 carries a rodless pneumatic cylinder 100 having a piston (not shown). The cylinder 100 mounts a bracket 102 which supports a fluid motor such as a pneumatic cylinder 104 having a piston rod 106. The outer end of the piston rod 106 mounts a transfer bracket 108 which carries a hanger pick-up plate 110 formed with a finger 112 at one end and a trip bar 114 at the opposite end. See also FIG. 3.

As shown in FIGS. 3-5, the rodless pneumatic cylinder 100 is operable to move the cylinder 104 and transfer bracket 108 vertically along the column 98 between a lowered position at the base of column 98 and a raised position at the top of column 98 adjacent the take-away rail 96. In the lowered position shown in solid lines in FIG. 3, the piston rod 106 of cylinder 104 is initially placed in the retracted position so that the hanger pick-up plate 110 is spaced from a hanger 16a supported by the feed arm 72 against the garment form 28. A shirt 20 is then placed over the hanger 16a and garment form 28, and the inspection operation is performed. After a shirt 20 has been inspected, the pneumatic cylinder 104 is activated to move the piston rod 106 to an extended position shown in phantom lines in FIG. 4. In this extended position, the finger 112 of hanger pick-up plate 110 is placed immediately beneath the hook portion 17a of hanger 16a.

In response to operation of a foot pedal (not shown) by the inspector, the rodless pneumatic cylinder 100 moves upwardly along the vertical column 98. In turn, the cylinder 104 and hanger pick-up plate 110 are moved vertically upwardly so that the finger 112 of hanger pick-up plate 110 engages the hook portion 17a of hanger 16a and lifts it upwardly. The hanger pick-up plate 110 pivots relative to the bracket 108 in a counterclockwise direction, as viewed in FIGS. 1 and 3, under the weight of the hanger 16a and shirt 20. The shirt 20 placed on garment form 28 is thus also lifted upwardly with the hanger 16a and removed from the inspection-hangering station 12 in a hangered position on the hanger 16a.

The hangered shirt 20 is then carried to the top of the vertical column 98 and discharged onto the take-away rail 96. As mentioned above, the hanger pick-up plate 110 pivots in a counterclockwise direction as its finger 112 engages the hook portion 17 of a hanger 16. A stop 116 is provided at the top of vertical column 98 which engages the trip bar 114 at the opposite end of the hanger pick-up plate 110. This pivots the hanger pick-up plate 110 in the opposite, clockwise direction and causes the hanger 16 and shirt 20 carried thereon to slide by gravity along the hanger pick-up plate 110, stop 116 and then onto the take-away rail 96. See FIG. 3. The hanger 16 and shirt 20 are carried by take-away rail 96 to another station (not shown) for further processing.

After discharging a shirt 20 and hanger 16 onto take-away rail 96, the hanger pick-up plate 110 must be returned to the lowered position at the bottom of vertical column 98 in preparation to lift another shift 20 from the inspection-hangering station 12. This is accomplished by activating rodless pneumatic cylinder 100 which carries the transfer bracket 108 and hanger pick-up plate 110 downwardly along vertical column 98. In the course of moving downwardly toward the hanger pick-up position, the pneumatic cylinder 104 is activated to move piston rod 106 to its retracted position shown in solid lines in FIG. 4. This avoids any interference of the transfer bracket 108 and/or the hanger pick-up plate 110 with the hanger transfer member 66 or a hanger 16 positioned adjacent the garment form 28.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, although the lighting fixtures 30, 32 are shown in position immediately beneath the garment form 28 so that they are located within the interior of a shirt 20 placed onto the garment form, it is contemplated that one or more lighting fixtures could be positioned at essentially any location nearby the garment form so long as the light produced shines through a shirt carried on the garment form.

Therefore, it is intended that the invention not be limited to the particular embodiment disclosed as the best mode contemplated for carrying out this invention, but that the invention will include all embodiments falling within the scope of the appended claims.

I claim:
1. Apparatus for inspecting an open-necked garment for defects, comprising:
   a support post;
   a garment form carried by said support post, said garment form being adapted to contact the inside of a garment at the shoulders so that the garment hangs vertically downwardly in an extended position atop said garment form;
   illumination means positioned with respect to said garment form so that said illumination means is located substantially inside of the garment carried on said garment form, said illumination means being effective to shine light through the garment carried on said garment form to permit visual inspection of defects in the garment;
   a mirror carried on a bracket positioned at the back of the garment carried on said garment form to permit visual inspection of the back side of the garment by looking into said mirror while standing at the front side of the garment.

2. The apparatus of claim 1 in which said garment support is mounted to a horizontally oriented platform carried at the top of said support post, said platform having an end extending laterally outwardly relative to said garment support which is adapted to engage the back side of a garment carried on said garment support to space said back side of said garment from the front side thereof.

3. Apparatus for hangering an open-necked garment, comprising:
   hanger supply means for serially feeding hangers to a take-away position, an open-necked garment being adapted to be draped over a hanger at said take-away position so that the hook portion of the hanger extends through the neck opening of the garment;
   take-away means for removing the hanger from said take-away position and simultaneously lifting the garment draped over the hanger away from said take-away position, said take-away means including:
   (i) a vertical column located proximate said take-away position;
   (ii) a transfer bracket movable vertically along said vertical column between a lowered position adjacent said take-away position and a raised position spaced vertically above said take-away position;
   (iii) fluid motor means carried on said transfer bracket and vertically movable therewith, said fluid motor means having a piston movable between an extended position and a retracted position along an axis substantially perpendicular to the direction of movement of said transfer bracket along said vertical column;
   (iv) hanger pick-up means connected to said piston of said fluid motor means for movement therewith, said hanger pick-up means being effective to engage the hook portion of a hanger at said take-away position with said piston in said extended position and said transfer bracket at said lowered position, and to lift said hanger vertically upwardly from said take-away position as said transfer bracket moves to said raised position;
   means for operating said hanger supply means after said take-away means has lifted one garment from said take-away position, said hanger supply means feeding another hanger to said take-away position in preparation for receiving another garment.

4. The apparatus of claim 3 in which said hanger supply means comprises:
   a supply rod adapted to support the hook portions of hangers;
   a shaft formed with a threaded outer surface, said shaft having a hanger pick-up end mounted to one end of said supply rod and a hanger discharge end, said shaft being rotatable with said supply rod to receive hangers at said hanger pick-up end from said supply rod and to discharge hangers from said hanger discharge end;
   a hanger transfer member including a plate located adjacent said discharge end of said shaft and a feed arm pivotally connected to said plate, said feed arm having an end located adjacent said take-away position which supports hangers thereat, said plate and said feed arm receiving hangers from said discharge end of said shaft which slide by gravity therealong to said take-away position.

5. Apparatus for inspecting and hangering an open-necked garment, comprising:
   a garment inspection station including garment support means for supporting an open-necked garment in an extended, unfolded position to permit visual inspection thereof, and illumination means positioned relative to said garment support means for shining light through the garment carried on said garment support means;
   hanger supply means for feeding hangers to said inspection station adjacent to said garment support means, the garment carried on said garment support means being adapted to be draped over said hanger supplied by said hanger supply means so that the hook portion of the hanger extends through the neck opening of the garment; and
   take-away means for removing said hanger from adjacent said garment support means and simultaneously lifting the garment draped over the hanger away from said inspection station.

6. The apparatus of claim 5 in which said garment support means comprises:
   a support post;
   a garment form carried by said support post, said garment form being adapted to contact the inside of a garment at the shoulders so that the garment hangs vertically downwardly in an extended position from atop said garment form.

7. The apparatus of claim 6 in which said illumination means comprises at least one lighting fixture carried on said support post in a position vertically beneath said garment form, said lighting fixture being positioned within the interior of a garment carried on said garment form to illuminate the inside of the garment for inspection.

8. The apparatus of claim 6 in which said illumination means comprises a pair of elongated, vertically oriented lighting fixtures mounted substantially parallel to one another on opposite sides of said support post.

9. The apparatus of claim 5 in which said take-away means comprises:
   a vertical column located proximate said garment support means;
   a transfer bracket movable vertically along said vertical column between a lowered position adjacent said garment support means and a raised position spaced vertically above said garment support means;
   fluid motor means carried on said transfer bracket and vertically movable therewith, said fluid motor means having a piston movable between an extended position and a retracted position along an axis substantially perpendicular to the direction of movement of said transfer bracket along said vertical column;
   hanger pick-up means connected to said piston of said fluid motor means for movement therewith, said hanger pick-up means being effective to engage the hook portion of a hanger at said garment support means with said piston in said extended position and said transfer bracket at said lowered position, and to lift said hanger vertically upwardly from said garment support means as said transfer bracket move to said raised position.

10. The apparatus of claim 5 in which said hanger supply means comprises:
    a supply rod adapted to support the hook portions of hangers;
    a motor connected to said supply rod for rotating said supply rod;
    a shaft formed with a threaded outer surface, said shaft having a hanger pick-up end mounted to one end of said supply rod and a hanger discharge end, said shaft being rotatable with said supply rod to receive hangers at said hanger pick-up end from said supply rod and to discharge hangers from said hanger discharge end;
    a hanger transfer member including a plate located adjacent said discharge end of said shaft and a feed arm pivotally connected to said plate, said feed arm having an end located adjacent said garment support means which supports hangers in position thereat, said plate and said feed arm receiving hangers from said discharge end of said shaft which slide by gravity therealong to said garment support means;
    switch means located at said discharge end of said shaft for sensing the discharge of a hanger from said shaft onto said hanger transfer member, said switch means being operative in response to sensing the discharge of a hanger to deactivate said motor and stop the rotation of said supply rod and said shaft.

11. The apparatus of claim 10 in which said switch means is a limit switch having a trip arm in contact with said discharge end of said shaft, said trip arm being deflected as a hanger is discharged from said discharge end of said shaft.

12. The method of inspecting an open-necked garment for defects, comprising:
    feeding hangers adjacent to a garment form located at an inspection station;
    placing a garment over the garment form and the hanger at the inspection station so that the shoulders rest on said garment form and the garment extends downwardly therefrom in an unfolded position;
    conducting a direct visual inspection of one of the front side or back side of the garment carried on said garment form;
    conducting an indirect visual inspection of the other of said front side or back side of the garment carried on said garment form by viewing said other side in a mirror;

illuminating at least one lighting fixture positioned relative to said garment form so that said lighting fixture is located at least partially inside of said garment carried on said garment form, said lighting fixture shining light from the inside of the garment through the garment to permit inspection thereof for defects; and removing said hanger from adjacent said garment from and simultaneously lifting the garment draped over the hanger away from the inspection station.

13. The method of claim 12 further including the step of conducting a touch inspection of said garment while said garment is carried on said garment form before being removed with the hanger from the inspection station.

* * * * *